Nov. 24, 1959 J. J. KUESER Re. 24,738

ELECTRIC BAKER

Original Filed April 25, 1955 2 Sheets-Sheet 1

Inventor
John J. Kueser
by Bair, Freeman & Molinare
Attorneys

ELECTRIC BAKER

Original Filed April 25, 1955 2 Sheets-Sheet 2

Inventor
John J. Kueser
by Bair, Freeman & Molinare
Attorneys

United States Patent Office

Re. 24,738
Reissued Nov. 24, 1959

24,738

ELECTRIC BAKER

John J. Kueser, St. Louis, Mo., assignor to Knapp-Monarch Company, St. Louis, Mo., a corporation of Delaware Original No. 2,856,501, dated October 14, 1958, Serial No. 503,732, April 25, 1955. Application for reissue February 2, 1959, Serial No. 790,782

4 Claims. (Cl. 219—35)

Matter enclosed in heavy brackets [ ] appears in the original patent but forms no part of this reissue specification; matter printed in italics indicates the additions made by reissue.

This invention relates to an electric appliance, for use in a kitchen or the like, and more particularly relates to an electrically energized baker.

One of the problems involved in providing an electrically energized baker for use as an electric appliance in the kitchen involves the control of the heating thereof. Heretofore, it has been difficult to provide an adequate thermostatic control which accurately determined the temperature produced in the baking space. One of the reasons that accurate thermostatic control could not be achieved was the lack of uniform heating throughout the baker. Hot spots were often developed and the heating intensity varied throughout the baker. Additionally, the tray opening in earlier bakers, and the heat loss therefrom, provided a region wherein it was difficult to maintain the same degree of heating found throughout the remainder of the baker.

Accordingly, one object of this invention is to provide an improved baker wherein substantially uniform heating is achieved in the baking space thereof.

Another object of this invention is to provide a baker having substantially uniform heating throughout and including means for compensating for heat losses at the tray opening of the baker.

A further object of this invention is to provide a baker having a thermostatic control that is so arranged with respect to the parts of the baker as to provide a heating control that is accurately responsive to the temperatures achieved in the baker.

And another object of this invention is to provide a baker with a slidable tray therein that is provided with means for maintaining the tray substantially level when the tray is opened.

And still a further object of this invention is to provide a baker that is characterized by its simplicity and inexpensiveness of construction and design. and by its reliability in operation.

Further objects and advantages of this invention will become apparent as the following description proceeds and the features of novelty which characterize this invention will be pointed out with particularity in the claims annexed to and forming part of this specification.

A preferred embodiment of this invention is shown in the accompanying drawings, in which.

Figures 1, 2, 5:
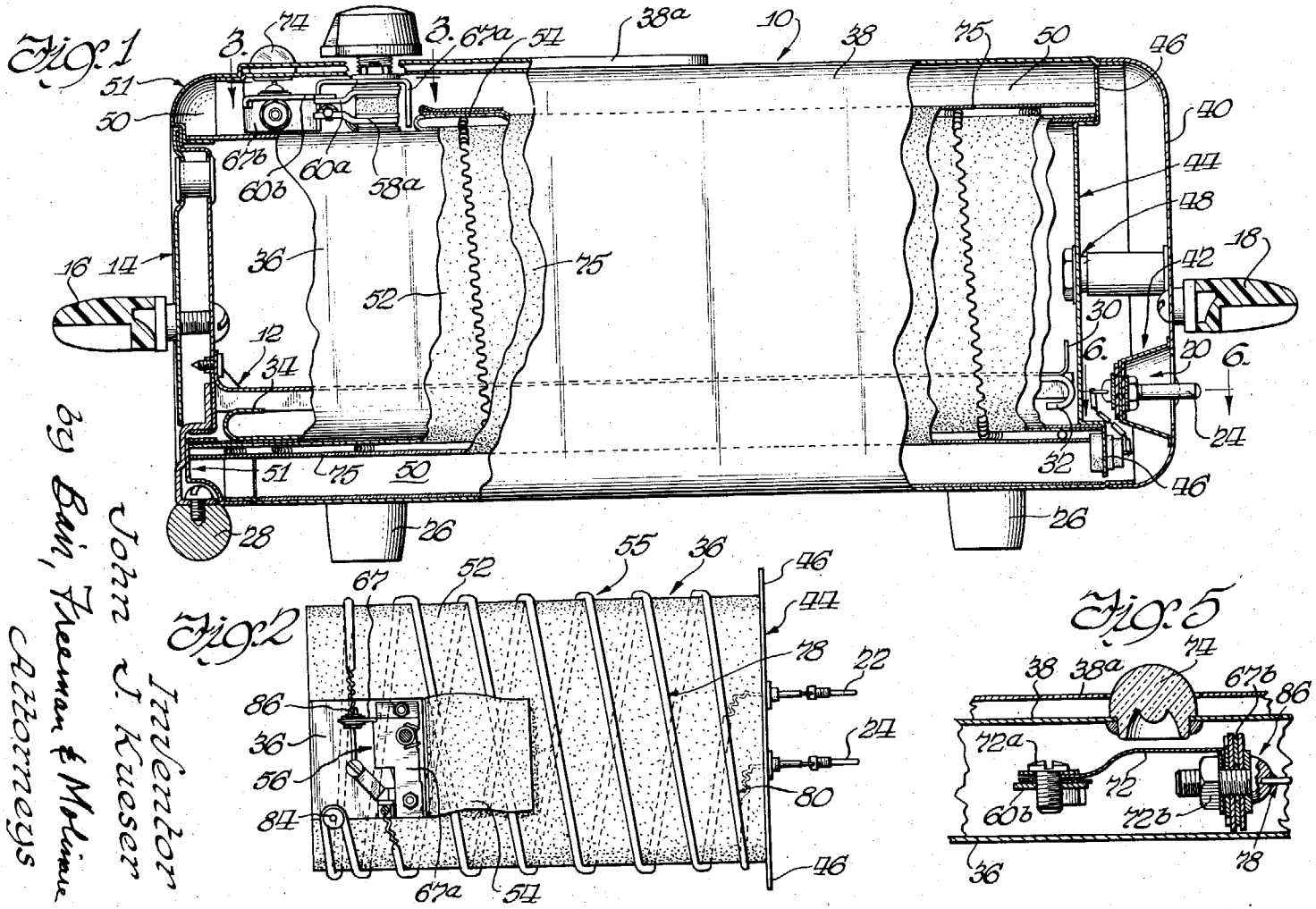
Figure 1 is a side view of the baker with some portions in elevation and other portions in section.
Figure 2 is a top plan view of the inner shell of the baker showing the resistance heating element wrapped therearound.
Figure 5 is a cross sectional view taken on line 5—5 of Figure 3.
Figure 3:
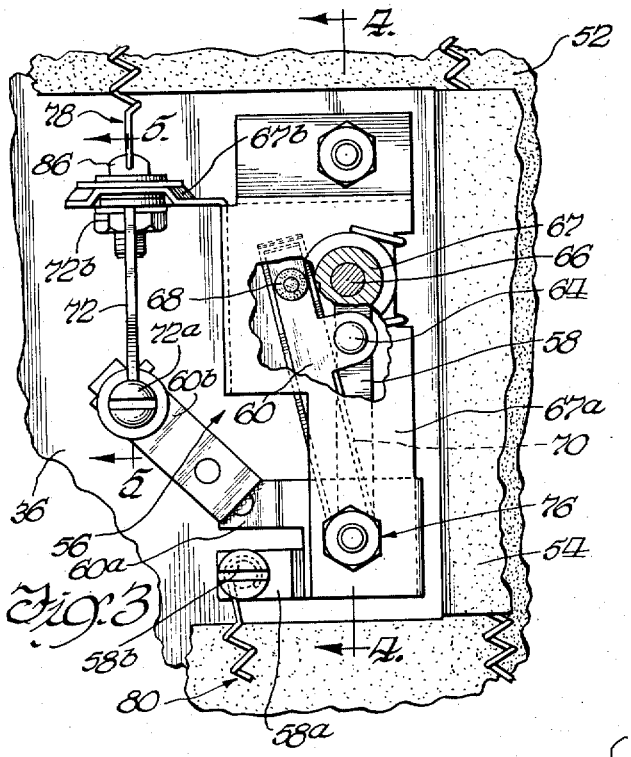
Figure 3 is a view of the thermostat assembly taken on line 3—3 of Figure 1.
Figure 6:
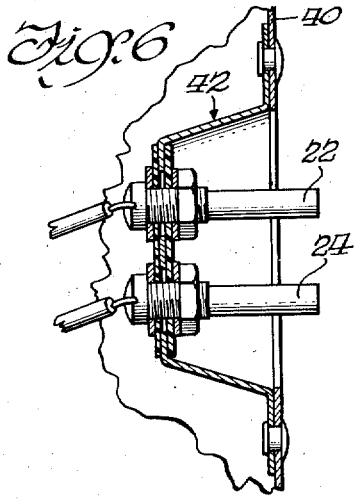
Figure 6 is a detailed view of the terminal mounting taken on line 6—6 of Figure 1.
Figure 4:
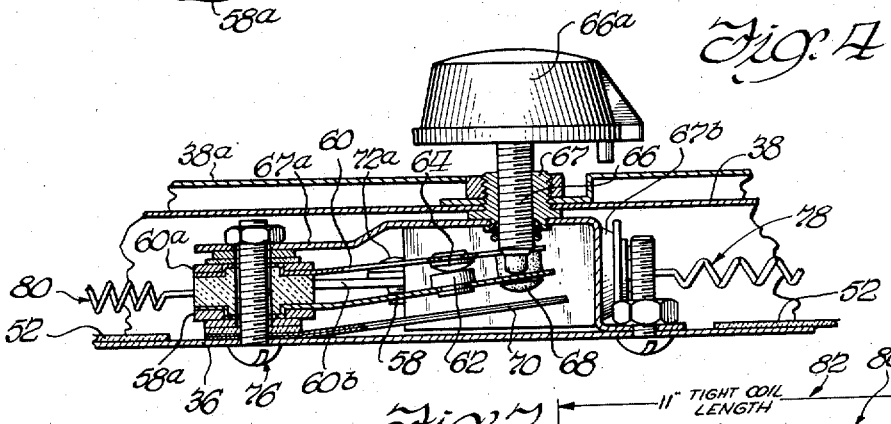
Figure 4 is a cross section of the thermostat assembly taken on line 4—4 of Figure 3.

Referring now to the drawings there is shown in Figure 1 an elongated baker generally indicated at 10 which in its finished form is open at one end and adapted to have a source of electrical energy connected at the opposite end. An elongated tray 12 is positioned within the baker and is axially slidable into and out of the baking space that is enclosed by said baker.

The tray 12 carries a door 14 which is adapted to close the open end of the baker. The door 14 is provided with a heat resistant handle 16 which may be formed of any suitable material, such as phenolic resin or the like, and which handle 16 serves as means for manipulating the tray. The baker is provided with another handle 18 similar to handle 16. The handles 16 and 18 provide means for transporting the baker from one situs to another. Below the handle 18 the baker is recessed as indicated at 20, and within which recess is provided a pair of electric prong contacts 22 and 24 adapted to be connected by an electric cord to a source of electric power.

The baker is provided with a plurality of support legs 26 which are made of heat resistant material, such as a phenolic resin, for example. The tray 12 is provided with a support foot 28 at the forward or outer end thereof, adjacent the door 14. The support 28 is so proportioned that the baker 10 and the support foot 28 are operative to support the tray 12 in a substantially horizontal position when the tray is pulled partially out of said baker.

Referring to some of the details of the tray, said tray 12 is provided with an upstanding flange 30 at the innermost end of the tray to provide means for preventing objects being baked from falling off the tray. The tray 12 also carries a forwardly opening hook means 32 which is adapted to engage a hook means 34 carried by the baker 10 adjacent its open end, so as to normally limit the distance that the tray 12 may be pulled out from the baker. However, it will be appreciated that by merely tilting the tray 12 relative to the baker 10, the hook means 34 and 32 may be caused not to engage, thereby permitting complete removal of the tray 12 from the baker.

Referring now to the details of construction of the baker 10, there is an inner cylindrical shell 36 and an outer cylindrical shell 38. The outer shell carries a name plate 38a on the upper side thereof and a rear closure member 40 which is adapted to provide for the recess 20 heretofore described. The rear closure member 40 carries a bracket 42 on which the prongs 22 and 24 may be appropriately mounted.

The inner shell 36 is provided at its inner end with a transverse closure plate 44 which is secured to the inner shell 36 in any appropriate manner, such as by welding or the like. This transverse closure plate 44 has an annular flange 46 which extends outwardly beyond the periphery of the cylindrical inner shell 36 and is so proportioned to the internal dimension of the outer shell 38 as to cooperate therewith to serve as a spacer member for spacing the inner shell 36 from the outer shell 38. Nut and bolt means, generally indicated at 48, are provided for securing together the transverse closure plate 44 and the rear closure member 40.

When the inner shell 36 is assembled in the outer shell 38, so that the two shells are in spaced relation as shown, there is an elongated annular chamber or space 50 formed between said spaced inner and outer shells. It is within this annular chamber 50 that the means for heating the baker and controlling the heating circuits are positioned. The forward end of chamber 50 is closed by a forward closure means, generally indicated at 51, extending between the inner shell 36 and outer shell 38.

The inner shell 36 and the transverse closure plate 44 which is secured thereto are coated on all exposed surfaces thereof, with a thin layer of electrically-non-conductive material, which, however, is thin enough so as not to materially interfere with heat transfer therethrough. One type of coating which has proved successful is a fired porcelain enamel finish on a steel inner shell 36, although other coatings and insulating materials may probably be used, such as oxide coated aluminum, or oxide coated stainless steel, or an inner shell construction of bare metal coated on the inner side with a suitable high temperature paint or oxide and covered on its outer surface with a thin layer of starched fiberglass mat may be used. The porcelain enamel finish has been successfully used, and has been found to operate both to radiate heat efficiently and also to provide for ease of cleaning of the interior of the baker, and also provides electric insulation from the heating element which is wound around the inner shell 36.

In addition to the insulation provided by the fired porcelain enamel finish on the inner shell 36, there is provided a sheet of insulation 52, of asbestos or the like, which is wrapped completely around the outer cylindrical surface of inner shell 36. A segment 54 of said insulation sheet 52 is folded back, as shown, thereby exposing a portion of the inner shell 36 adjacent which is positioned a thermostatically controlled switch.

Wrapped around the insulation sheet 52 in a spiral or helical manner, with the axis of the helices, or spirals, located at the longitudinal axis of inner shell 36 is an energizing circuit, generally indicated at 55, which includes an elongated resistance heater. Interposed between the terminal ends of said resistance heater is a thermally controlled switch generally indicated at 56. The switch is of a type well known in the art but will be briefly described hereto complete the description of the operative device.

The switch 56 includes a pair of electrically conductive leaf spring members 58 and 60 which are mounted in a stacked arrangement wherein they are insulated from each other. The lowermost leaf spring 58 is normally biased upwardly by its own resiliency. The switch 56 is interposed between two segments of the energizing circuit 55, one segment of which connects electrically to leaf 58 through a bracket 58a and the other segment being electrically connected to leaf 60 by means of a bracket 60a. The leaves 58 and 60 carry contacts 62 and 64 which are normally in engagement with each other.

The leaf 58 engages a manually adjustable control stem 66 which limits the upward movement of the leaf 58. The leaf 60 carries a ceramic insulator 68 which projects from leaf 60 so that it is positioned across the path of movement of a bi-metal 70 that is responsive to temperature. The ceramic insulator operates to insulate the current carrying leaf 60 from the bi-metal 70. The bi-metal 70 is designed to move upwardly in response to an increase in the temperature being sensed by it, and is adapted to engage projection 68 and move leaf 60 upwardly relative to leaf 58 and thereby interrupt the circuit through switch 56.

The control stem 66 extends outwardly of the outer shell 38 and carries a knob 66a thereon. The control stem 66 is threaded in a ferrule 67 which, in turn, is carried by a bracket 67a that is carried on the inner shell 36, said bracket 67a being electrically insulated from the energizing circuit 55. The control stem 66 is adapted to depress leaf 58, or permit rising of said leaf 58 under its own resiliency, to a selected position. The relative positioning of leaf 58, in combination with the characteristics of the bi-metal 70, determines the temperature at which the switch 56 is opened by bi-metal 70.

There is also provided, in series with the switch 56 and between switch 56 and one segment of the energizing circuit, an indicator ribbon 72, which is of such a selected conductive material and resistance that it glows when energized. This indicator ribbon 72 is positioned where it may be viewed through a glass bezel 74 that is carried by the outer shell 38. The mounting for the indicator ribbon 72 includes a cantilevered conductor 60b which may be spot welded on bracket 60a and which carries a mounting post 72a for one end of the indicator ribbon 72. The other end of indicator ribbon 72 is connected to a mounting post 72b which is carried by an arm 67b extending from bracket 67a. When the appliance is heated, the indicator ribbon, when viewed through bezel 74, glows until the oven temperature has reached the desired thermostat setting. When the circuit through switch 56 is opened, the glow through bezel 74 ceases to be, indicating that the appliance is pre-heated and is ready to be loaded for a cooking cycle. With continued operation, the indicator bezel alternately glows and stops glowing as the thermostatically controlled switch cycles on and off.

The entire energizing circuit 54, including the resistance heating element, has wrapped around it another sheet of insulating material 75 which is disposed between the energizing circuit and the outer shell 38.

One of the important requirements of a successful baker is that there be a substantially accurate sensing of the temperature being attained in the baker. It has been found that when the sensing bi-metal 70 is in direct contact with the surface of the inner shell 36, there is improved temperature sensing which greatly increases the accuracy of the automatic control of the device. Accordingly, the switch 56 is arranged so that the bi-metal 70 is clamped in direct surface contact with the outer surface of the inner shell 36, through the medium of the stack switch arrangement and the nut and bolt means generally indicated at 76.

Referring to the resistance heater, said heater is composed of two elongated resistance heating elements 78 and 80, each of which is formed in part with a helically coiled portion 82, the helices of which are of relatively small diameter, and the axis of said helices being the longitudinal axis of the elongated heating element. The use of an helically coiled portion 82 in each of the heating elements 78 and 80 permits stretching of said heating elements 78 and 80 to certain selected lengths, as needed for wrapping around the inner shell 36. In addition, sub-portions of the helically coiled portions 82 may be stretched certain selected lengths so as to provide both a relatively small spacing of adjacent heating-element coils that will produce a relatively great production of heat, and a relatively great spacing of adjacent heating-element coils which will produce a lesser amount of heat per unit of length of the shell along which the heater elements are wrapped.

Figure 7:
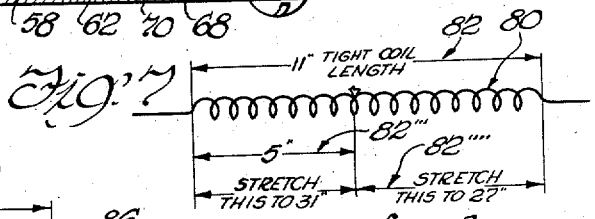
Figure 7 shows one of the resistance heating elements and illustrates the amount of stretch that the element undergoes in the assembly operation.
Figure 8:
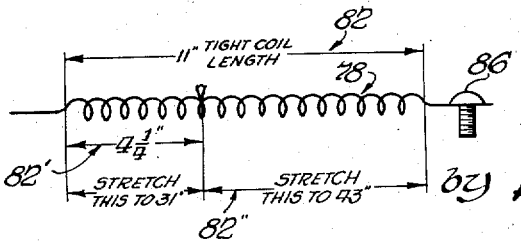
Figure 8 illustrates the other resistance heating element and illustrates the amount of stretch that it undergoes in the assembly operation.

Figures 7 and 8 illustrate examples of heating elements which have been utilized successfully for obtaining good heating characteristics in a baker of a type described herein. In Figure 8, the heating element 78 is shown as including 11 inches of tight coil length which has been sub-divided into a sub-portion 82′ or 4¼ inches unstretched length that is later stretched to a length of 31 inches, and the other sub-portion 82″ of 6¾ inches unstretched length is stretched to a length of 43 inches. In Figure 7, the tight coil length of heating element 80 is 11 inches, and this heating element is sub-divided so that the sub-portion 82‴, of 5 inches unstretched length, is stretched 31 inches and the other sub-portion 82⁗, of 6 inches unstretched length, is stretched to a length of 27 inches.

As shown in Figure 2, the heater 78 connects to prong 22 and is wrapped spirally around inner shell 36 with the realtively great spacing of heating-element coils adjacent the rear or closed end of the inner shell 36. The heater 78 then reaches a post 84, which is carried by the inner shell 36, and is wrapped therearound so as to reverse the direction of heater element 78 and then again passes around inner shell 36 to a terminal 86, which is carried on arm 67b and is electrically connected to mounting post 72b.

The heating element 80 connects to prong 24 and is wrapped spirally around inner shell 36 with the helices of heating element 80 alternated with the helices of heating element 78 and with substantially uniform spacing between said helices along substantially the entire axial length of inner shell 36. Heating element 80 terminates in an electric connection to a mounting post 58b carried on bracket 58a heretofore described.

The spacing of the relatively large diameter helices of heating elements 78 and 80 that are wound around inner shell 36 is arranged to be somewhat smaller adjacent the open end of the inner casing 36 than the spacing between said helices which exists over the greater portion of the axial length of the shell 36. This smaller spacing adjacent the open end of the baker, in combination with the smaller spacing of heating-element coils of the stretched sub-portions of coil portions 82 of the heater elements 78 and 80, which are also located adjacent said open end of shell 36, cooperates to compensate for heat losses from said open end and to substantially provide for uniform heating throughout the entire axial length of the baker.

While there has been shown and described a particular embodiment of this invention, and while there has been described herein a particular arrangement and example of heating-coil spacings, such specific examples are merely illustrative and are not limiting, and it will be obvious to those skilled in the art that various changes and modifications may be made therein without departing from the spirit and scope of this invention and, therefore, it is intended in the appended claims to cover all such changes and modifications as fall within the true spirit and scope of the inventions expressed therein.

What I claim as new, and desire to secure by Letters Patent of the United States, is:

1. An electric baker comprising spaced elongated inner and outer tubular shells defining an *elongated annular air space of substantially uniform dimension along the length thereof disposed between the shells, and each shell being* [annular air space therebetween and each] closed at one end and assembled to define an open ended body which encloses a baking space, an elongated tray movable axially into and out of said baking space and carrying a closure member for the open end of said body, said inner shell being formed of sheet metal coated on the outer surface thereof with a layer of electrically-non-conductive material, heating means in the annular air space between said spaced inner and outer shells comprising an inner sheet of insulation separate from the inner shell and surrounding the tubular wall of said inner shell, said inner sheet of insulation being shaped to expose a portion of the outer surface of said inner shell, an energizing circuit including a resistance heating element wrapped around the insulated inner shell, and an outer sheet of insulation between said heating element and said outer shell, and *thermostatic switch means located wholly in said substantially uniformly dimensioned* [thermostatic means located in said] annular air space and being interposed in the energizing circuit for said heating means , *said thermostatic switch means* including a bi-metal control held in tight thermal conducting contact with the outer surface of said non-conductive layer of material on the said exposed portion of said inner shell.

2. An electric baker comprising spaced elongated inner and outer tubular shells each closed at one end and assembled to define an open ended body which encloses a baking space; a tray movable axially into and out of said baking space and carrying a closure member for the open end of said body; and heating means in the space between said spaced inner and outer shells comprising an inner insulation surrounding the tubular wall of said inner shell, and an elongated resistance heating element wrapped around said insulated inner shell in relatively large diameter helices whose axis is the longitudinal axis of said inner shell, said elongated resistance heating element comprising at least one helically coiled portion, the helices of which are of relatively small diameter and whose axis is the longitudinal axis of said elongated heating element, said helically coiled portions of the heating element affording means for stretching same to vary the total length over which the heating element extends, and said helically coiled portions of the heating element having sub-portions thereof stretched to varying amounts so as to provide a greater proportionate length of each heating element adjacent the open end of the baker and a smaller proportionate length of the heating element adjacent the closed end of the baker so as to compensate for heat losses from the open end of the baker and so as to approximate uniform heating throughout the axial length of the baking space.

3. An electric baker comprising spaced elongated inner and outer tubular shells each closed at one end and assembled to define an open ended body which encloses a baking space; a tray movable axially into and out of said baking space and carrying a closure member for the open end of said body; and heating means in the space between said spaced inner and outer shells comprising an inner insulation surrounding the tubular wall of said inner shell, and an elongated resistance heating element wrapped around said insulated inner shell in relatively large diameter helices whose axis is the longitudinal axis of said inner shell, said helices being substantially equally spaced along the major portion of axial length of said inner shell and having a smaller spacing adjacent the open end of said baker, said elongated resistance heating element comprising at least one helically coiled portion, the helices of which are of relatively small diameter and whose axis is the longitudinal axis of said elongated heating element, the helically coiled portions of the heating element affording means for stretching the same to vary the total length over which the heating element extends, and said helically coiled portions of the heating element having sub-portions thereof stretched to varying amounts so as to provide a smaller heating-element coil spacing adjacent portions of the baker where greater concentration of heat production is desired and greater heating-element coil spacing adjacent portions of the baker where lesser concentration of heat production is desired, whereby the smaller spacing of the relatively large diameter helices, in combination with the smaller spacing of the stretched sub-portions of the smaller diameter helices cooperate to compensate for heat losses from said open end of the baker, and to provide for substantially uniform heating throughout the entire axial length of the baker.

*4. An electric baker comprising spaced elongated inner and outer tubular shells defining an elongated annular air space of substantially uniform dimension along the length thereof disposed between the shells, and each shell being closed at one end and assembled to define an open ended body which encloses a baking space, an elongated tray movable axially into and out of said baking space and carrying a closure member for the open end of said body, said inner shell being formed of sheet metal, heating means in the annular air space between said spaced inner and outer shells comprising an inner sheet of insulation separate from the inner shell and surrounding the tubular wall of said inner shell, said inner sheet of insulation being shaped to expose a portion of the outer surface of said inner shell, an energizing circuit including a resistance heating element wrapped*

*around the insulated inner shell, and an outer sheet of insulation between said heating element and said outer shell, and thermostatic switch means located wholly in said substantially uniformly dimensioned annular air space and being interposed in the energizing circuit for said heating means, said thermostatic switch means including a bi-metal control held in tight thermal conducting contact with the outer surface of said exposed portion of said inner shell.*

References Cited in the file of this patent or the original patent

UNITED STATES PATENTS

| | | |
|---|---|---|
| 759,909 | Pelton | May 17, 1904 |
| 993,314 | Mieth | May 23, 1911 |
| 1,282,330 | Aller | Oct. 22, 1918 |
| 1,694,762 | Ackerman | Dec. 11, 1928 |
| 1,870,619 | Flanzer | Aug. 9, 1932 |
| 1,899,933 | Bennett | Mar. 7, 1933 |
| 1,936,215 | Speaker | Nov. 21, 1933 |
| 2,077,687 | Goldbert | Apr. 20, 1937 |
| 2,086,827 | Smith | July 13, 1937 |
| 2,088,586 | Cole | Aug. 3, 1937 |
| 2,305,056 | Austin | Dec. 15, 1942 |
| 2,491,529 | Spreen | Dec. 20, 1949 |
| 2,597,695 | Braski | May 20, 1952 |
| 2,677,748 | Naylor | May 4, 1954 |
| 2,678,958 | Hintenberger | May 18, 1954 |
| 2,683,795 | Sheidler | July 13, 1954 |
| 2,699,489 | Gorham | Jan. 11, 1955 |